(12) United States Patent
Iuzifovich et al.

(10) Patent No.: US 11,094,191 B2
(45) Date of Patent: Aug. 17, 2021

(54) DISTRIBUTED SAFETY INFRASTRUCTURE FOR AUTONOMOUS VEHICLES AND METHODS OF USE

(71) Applicants: Iurii V. Iuzifovich, Monte Sereno, CA (US); Anzhelina Iuzifovich, Los Gatos, CA (US); Natalia Yuzifovich, Los Gatos, CA (US)

(72) Inventors: Iurii V. Iuzifovich, Monte Sereno, CA (US); Anzhelina Iuzifovich, Los Gatos, CA (US); Natalia Yuzifovich, Los Gatos, CA (US)

( * ) Notice: Subject to any disclaimer, the term of this patent is extended or adjusted under 35 U.S.C. 154(b) by 0 days.

(21) Appl. No.: 16/396,660

(22) Filed: Apr. 27, 2019

(65) Prior Publication Data

US 2019/0333378 A1 Oct. 31, 2019

Related U.S. Application Data

(60) Provisional application No. 62/664,014, filed on Apr. 27, 2018.

(51) Int. Cl.
| | |
|---|---|
| G08G 1/00 | (2006.01) |
| G08G 1/09 | (2006.01) |
| H04N 5/247 | (2006.01) |
| G06K 9/00 | (2006.01) |
| G08G 1/16 | (2006.01) |

(52) U.S. Cl.
CPC ......... G08G 1/091 (2013.01); G06K 9/00785 (2013.01); G08G 1/164 (2013.01); H04N 5/247 (2013.01)

(58) Field of Classification Search
CPC .... G08G 1/091; G08G 1/164; G06K 9/00785; H04N 5/247
See application file for complete search history.

(56) References Cited

U.S. PATENT DOCUMENTS

| | | | | |
|---|---|---|---|---|
| 5,999,877 | A * | 12/1999 | Takahashi | G06K 9/00785 348/149 |
| 9,952,594 | B1 * | 4/2018 | Zhao | G05D 1/0094 |
| 10,147,315 | B2 * | 12/2018 | Fowe | G08G 1/0141 |
| 10,178,430 | B2 * | 1/2019 | Wang | H04N 5/225 |
| 10,516,858 | B2 * | 12/2019 | Watanabe | G08G 5/0078 |
| 10,521,665 | B2 * | 12/2019 | Nerayoff | G06Q 50/265 |
| 2005/0169500 | A1 * | 8/2005 | Takahashi | G06T 7/20 382/104 |

(Continued)

Primary Examiner — Dave Czekaj
Assistant Examiner — Shanika M Brumfield
(74) Attorney, Agent, or Firm — Keith Kline; The Kline Law Firm PC

(57) ABSTRACT

Systems and methods for assisting navigation of traffic participants are described herein. An exemplary method may commence with collecting street object data by at least one sensor mounted on one of a plurality of poles. The street object data may be associated with at least one street object within a range of the at least one sensor. The method may continue with analyzing the street object data and generating street object metadata corresponding to the at least one street object. The method may continue with broadcasting the street object metadata to at least one traffic participant within the range. The street object metadata may be used to provide at least one warning to the at least one traffic participant of traffic conditions to allow the at least one traffic participant to take at least one proactive action.

20 Claims, 5 Drawing Sheets

(56) References Cited

U.S. PATENT DOCUMENTS

| | | | | |
|---|---|---|---|---|
| 2006/0095199 | A1* | 5/2006 | Lagassey | G07C 5/008 |
| | | | | 701/117 |
| 2006/0274917 | A1* | 12/2006 | Ng | G06K 9/3241 |
| | | | | 382/103 |
| 2007/0067410 | A1* | 3/2007 | Mulligan | G08G 1/09 |
| | | | | 709/217 |
| 2008/0285803 | A1* | 11/2008 | Madsen | G01S 17/04 |
| | | | | 382/105 |
| 2009/0041302 | A1* | 2/2009 | Nagaoka | G06K 9/00369 |
| | | | | 382/103 |
| 2010/0063736 | A1* | 3/2010 | Hoetzer | B60W 30/09 |
| | | | | 701/301 |
| 2010/0271497 | A1* | 10/2010 | Monsive, Jr. | G08G 1/04 |
| | | | | 348/211.99 |
| 2011/0001626 | A1* | 1/2011 | Yip | H05B 47/16 |
| | | | | 340/635 |
| 2013/0141576 | A1* | 6/2013 | Lord | G08G 1/04 |
| | | | | 348/148 |
| 2013/0144490 | A1* | 6/2013 | Lord | B60T 17/22 |
| | | | | 701/41 |
| 2015/0035685 | A1* | 2/2015 | Strickland | G08G 1/166 |
| | | | | 340/901 |
| 2016/0125246 | A1* | 5/2016 | Ryhorchuk | G06K 9/00771 |
| | | | | 348/143 |
| 2017/0023945 | A1* | 1/2017 | Cavalcanti | H05B 47/19 |
| 2017/0061791 | A1* | 3/2017 | Cherewka | G08G 1/0955 |
| 2017/0301220 | A1* | 10/2017 | Jarrell | F21S 2/005 |
| 2018/0096595 | A1* | 4/2018 | Janzen | G06K 9/00785 |

* cited by examiner

DISTRIBUTED SAFETY INFRASTRUCTURE FOR AUTONOMOUS VEHICLES AND METHODS OF USE

CROSS-REFERENCE TO RELATED APPLICATIONS

This application claims priority of U.S. Provisional Patent Application No. 62/664,014 filed on Apr. 27, 2018, entitled "DISTRIBUTED SAFETY INFRASTRUCTURE FOR AUTONOMOUS VEHICLES AND METHODS OF USE", which is incorporated herein by reference in its entirety.

TECHNICAL FIELD

The present disclosure relates generally to safety infrastructures that support and enable safe autonomous vehicle operations.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Autonomous driving in the city would bring great benefits to its inhabitants and it is the future of driving. However, cities have been designed for people and cars driven by people. There have been attempts to build Artificial Intelligence (AI) solutions to assist an autonomous vehicle in unpredictable traffic conditions. However, such solutions typically involve using sensors installed on vehicles and, while autonomous vehicles can reduce a decision time to zero, the braking distance remains high and vehicles remain unaware of traffic conditions outside of the field of view of their sensors.

Furthermore, self-driving cars have challenges in identifying pedestrians, especially when they are outside of the field of view of their sensors. When a pedestrian appears in front of the car and a view of that pedestrian is obstructed by, for example, a different car, the autonomous car does not possess any inherent advantages over a human driver.

Moreover, some autonomous vehicles are electric cars and these types of vehicles have lower noise levels and accidents tend to increase when pedestrians do not hear the approaching car. Making noise artificially higher is not a good solution as noise pollution a serious problem. Additionally, distracted pedestrian walking is another problem that does not currently have a technical solution. Moreover, people with lower vision and hearing capabilities, legally blind or deaf, or just distracted by technology such as a smartphone, are especially affected by these issues.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for assisting navigation of traffic participants. In some exemplary embodiments, a system for assisting navigation of traffic participants may include a plurality of poles located adjacent to a street and having at least one sensor, an object data processing unit, and a wireless transmission unit. The at least one sensor can be configured to collect street object data associated with at least one street object within a range of the at least one sensor. The object data processing unit can be configured to analyze, in real time, the street object data. The object data processing unit can be further configured to generate street object metadata corresponding to the at least one street object. The wireless transmission unit may be associated with a unique identification number and configured to broadcast the street object metadata to at least one traffic participant within the range. The street object metadata may be used to provide at least one warning to the at least one traffic participant of traffic conditions to allow the at least one traffic participant to take at least one proactive action.

A method for assisting navigation of traffic participants may commence with collecting street object data by at least one sensor installed on a plurality of poles adjacent to a street. The street object data may be associated with at least one street object within a range of the at least one sensor. The method may continue with analyzing, by an object data processing unit, the street object data in real time. The method may further include generating, by the object data processing unit, street object metadata corresponding to the at least one street object. The method may continue with broadcasting, by a wireless transmission unit, the street object metadata to at least one traffic participant within the range. The street object metadata may be used to provide at least one warning to the at least one traffic participant of traffic conditions to allow the at least one traffic participant to take at least one proactive action.

Additional objects, advantages, and novel features will be set forth in part in the detailed description section of this disclosure, which follows, and in part will become apparent to those skilled in the art upon examination of this specification and the accompanying drawings or may be learned by production or operation of the exemplary embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
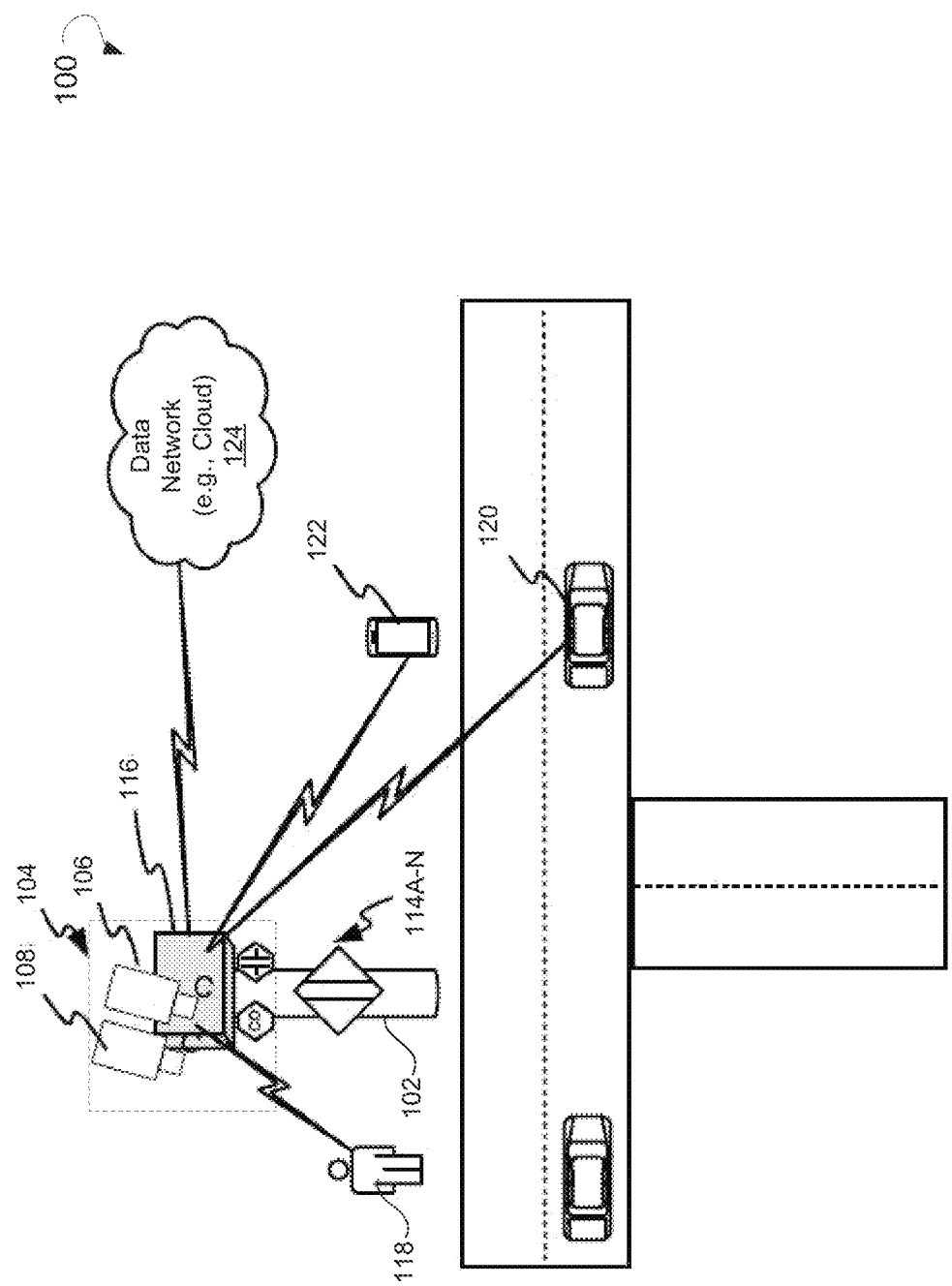
FIG. 1 illustrates an environment within which systems and methods for assisting navigation of traffic participants can be implemented, in accordance with an exemplary embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides specific technical solutions to technical problems that have arisen in the field of autonomous vehicle operations. The present disclosure addresses these technical problems through improved infrastructures that support autonomous vehicle operations. Some embodiments implement a smart street infrastructure. Smart city features should include one for autonomous driving. This driving should not include just cars that transport people, but may also include a cargo autonomous vehicle. A large city can be compared to a warehouse with distractions. A typical street may have pedestrians, on foot or riding personal transportation equipment, such as bicycles, scooters and the like, autonomously driven cars, computer-assisted cars, human-driven cars, delivery robots, animals, stationary objects, and lighting or utility poles. Many traffic lights already have integrated cameras, but they are focused on cars.

The infrastructures of the present disclosure contemplate the use of additional cameras mounted on other poles or other types of street-adjacent structures. These cameras are configured to focus on both street surfaces and at adjacent pedestrian areas. A smart module at each pole may have an Internet connectivity and real-time, low latency, low power (short-distance) radio broadcasting module with low bandwidth requirements. The camera can generate a real time video feed to be processed into a low fidelity stream that includes associated data such as location, direction, speed of each object in the field of view of the camera, prediction, other metadata, and so forth, as well as optionally a map of stationary objects.

Given a limited view of each camera, the number of moving objects (such as cars, people, animals, and so forth) in the field of view of any given camera would not be prohibitively large and can be processed without requiring excess computing overhead. Many structural poles located adjacently to streets, such as light poles and signs, already have access to electricity, therefore, the camera system does not have to be particularly energy-efficient, although in some embodiments the camera system can operate off a battery or other power such as solar. It should be understood that "street" as used herein refers to any street, roadway, and their surroundings.

In some exemplary embodiments, the sensors include a hyper-spectral imaging system. While a hyper-spectral imaging is typically of a lower resolution than visible light imaging, a hyper-spectral imaging system provides additional information about materials, objects and processes, through the output of an image cube where a vector of values corresponds to each pixel, corresponding to the wavelength bands of the hyper-spectrometer. Hyper-spectral imaging can help better differentiate between living and non-living objects and provide better information about weather conditions, among other uses. Processing unit on the pole may overlay hyper-spectral image on the information from other sensors to provide additional information not otherwise easily available to the imaging sensor, even with computational post-processing. Hyper-spectral information can provide additional information about the street conditions and help the cars make appropriate adjustments to their behavior and/or speed. Another use of hyper-spectral imaging is similar to precise agriculture: information available in the hyper-spectral image contains information about the needs of trees, plants, or flowers, growing on the sidewalk, including information about watering requirements, weeds, and diseases. This can enable an automated, robot-based precision maintenance of greenery in cities.

In some exemplary embodiments, the sensors include a radar. A radar can also be installed on the pole. Imaging sensors work best in good weather conditions, but in adverse weather conditions (rain, snow) their performance degrade, even when the sensor protective surface is not affected due to the height of the sensor and downward orientation. A radar can provide additional layer of information to help offset degradation of the imaging sensors and still provide the most important information to the cars and other signal recipients. Additionally, stereo vision can help produce more accurate spatial, size, and dimension information about non-human objects. While radar performance varies and depends on multiple factors, including the radio frequency, radars are typically not affected by rain or snow as much as passive or active visible spectrum imaging systems.

In some exemplary embodiments, a depth measuring device can utilize a parallax between two cameras to add a stereo vision and to help build a skeleton model of the pedestrians. The skeleton model can be used to improve predictions, as well as can help differentiate between people on the side of a street that are situation-aware from distracted people. Stereo vision can be done from a single pole, or, with overlapping pole information. The parallax can be either horizontal, or vertical (located at different height of the pole). Additionally, such robots can rely on the pole-enabled vision to improve precision of maintenance jobs by augmenting their on-board imaging systems.

In some exemplary embodiments, a drone can be added to the autonomous vehicle in such a way that when the autonomous vehicle leaves the area of the smart city infrastructure, a drone can be dispatched from the autonomous vehicle to fly above and in front of the autonomous vehicle and to guide the autonomous vehicle from above.

With a standardized and unencrypted signal, the information transmitted by the drone can be shared between different cars, thereby creating a "herd immunity" effect. In particular, if a large enough percentage of cars are using their drones as navigation aid, the cars can share the signal received from the drones with other cars so that other cars (those that are not using the drones) can utilize the same signal and take advantage of the signal.

In some exemplary embodiments, peer-to-peer (e.g. pole-to-pole) communication can be implemented. When a segment of a city has smart infrastructure with described poles, direct communication between poles can be implemented, thereby creating a mesh network. This mesh network can send advance notices to other poles even when cellular infrastructure is down or not available. Examples of the information that can be transmitted between poles: an accident that is outside of the view of a car and/or other poles, information about a fast-moving object between the field of view of poles (similar to a hand-off procedure between air traffic controls tracking an airplane), and the like. The same information can also be transmitted through the cloud using cellular networks.

In some exemplary embodiments, predictions can be made by observing objects for a period of time. When objects (such as humans) can be observed for a relatively long time, compared to the imaging system on board of a car, behavioral predictions can be made and communicated alongside with location information. This can also include the level of distraction: a human communicating on a cellphone has a limited attention and vision to see the approaching car, compared to an alert human. Observing the human for several seconds or even minutes can produce a model that can predict the next actions of each specific human, with or without a skeleton model. To prevent an accident, only actions within the next few seconds need to be predicted, and this is one of the key differentiators of the pole-based system from an on-board only system of a fast-moving car. At 30 miles per hour, a car moves 44 feet in 1 second. This translates to a sub-second time that is available for the car to detect any moving object in its field of vision, which is often inadequate to make a good prediction.

Referring now to the drawings, FIG. 1 illustrates an environment 100 (e.g., infrastructure) within which methods and systems for assisting navigation of traffic participants can be implemented. The environment 100 may include a system for assisting navigation of traffic participants, also referred to as a system 300, pedestrians 118, cars 120, specialized equipment 122, and a data network 124.

The data network 124 may include the Internet, a computing cloud, and any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking. The data network may include a network of data processing nodes, also referred to as network nodes, that are interconnected for the purpose of data communication.

The system 300 may include a plurality of poles 102, a safety data gathering and processing apparatus also referred herein to as an object data processing unit 104, and a wireless interface also referred herein to as a wireless transmission unit 112. The object data processing unit 104 and the wireless transmission unit 112 can be disposed in the pole 102 and, optionally, placed into a weatherproof housing 116. In some exemplary embodiments, the wireless transmission unit 112 can be a component of the object data processing unit 104.

Figure 2:
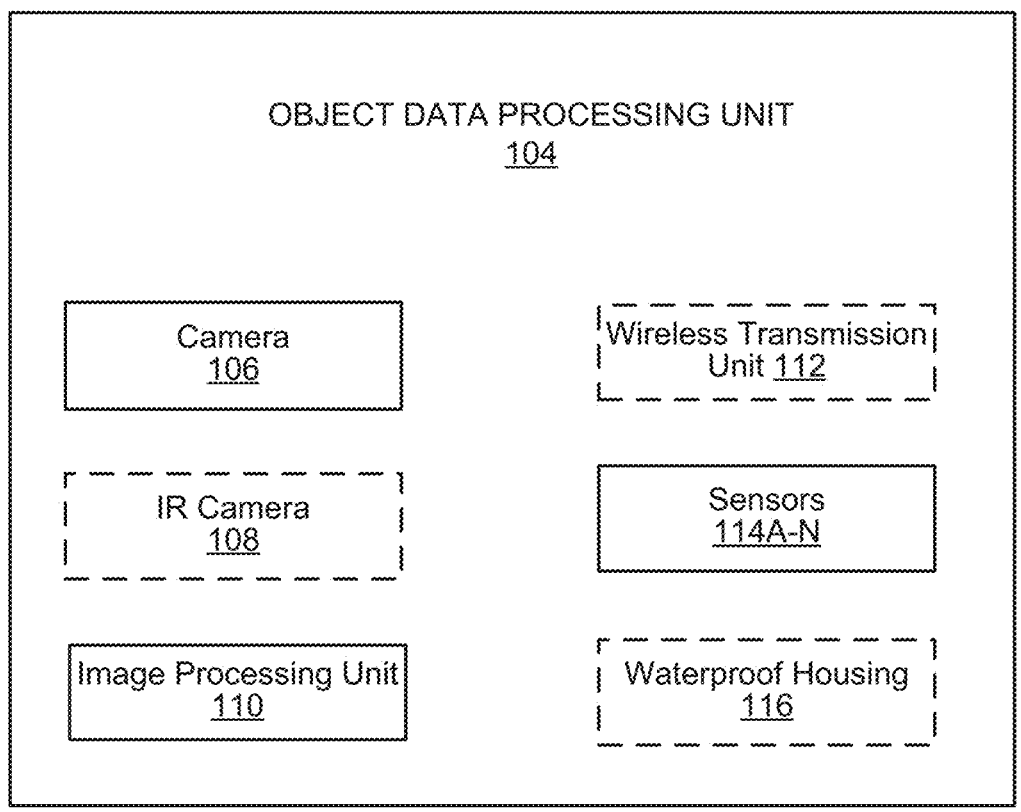
FIG. 2 is a block diagram showing various modules of an object data processing unit, in accordance with an exemplary embodiment.

The object data processing unit 104 is further shown in detail on FIG. 2. In general, the object data processing unit 104 may include a camera 106 (such as a high resolution camera), an optional infrared (IR) camera 108, an image/video processing unit also referred herein to as an image processing unit 110, a wireless transmission unit 112, and a plurality of environmental sensors 114A-N. The sensors 114A-N can also be hyperspectral image sensors or radar. The image processing unit 110 and the wireless transmission unit 112 can be enclosed in the weatherproof housing 116.

In more detail, the object data processing unit 104 on the pole 102 can have the camera 106 which can include a high resolution camera operating in the visible spectrum. In addition, the IR camera 108 can be used to generate IR images that can be processed to correctly classify objects and differentiate living objects from non-living objects and to help during the night time when artificial lighting is not turned on or not sufficient for the visible light imaging sensor. The image processing unit 110 can perform image segmentation, classification, and movement vector calculation in real-time. The image processing unit 110 may be a specifically programmed computing device, such as an integrated microprocessor, as well as, in some embodiments, include an application specific integrated circuit or other similar computing device. The image processing unit 110 can include any of the features of a system 500 of FIG. 5 as well.

As noted above, the object data processing unit 104 mounted on the pole 102 can include the wireless transmission unit 112 for Internet connectivity used to synchronize with the data network 124, such as a cloud, for updates and for use as a control channel if needed. For example, software updates and other operational commands can be transmitted over a dedicated channel using the wireless transmission unit 112. The wireless transmission unit 112 can also provide wireless broadcasting of processed information such as location information that can be derived from hardwired components or determined from Global Positioning System (GPS)-based information. The wireless transmission unit 112 can also broadcast information that may assist in triangulating a location of receivers near the street. This can be especially important in downtowns with high rises where GPS signal is blocked, or distorted through reflection off buildings. Triangulation with beacons can provide precision within a very short distance, unobstructed by clouds and buildings. In some embodiments, each pole 102 and/or components mounted on the pole 102 can be identified using a unique identification number, which can be used for data addressing, determining the location where the data are collected by the pole, triangulation, and so forth. In various embodiments, all components disclosed for use on the pole 102 can be enclosed in the weatherproof housing 116.

In operation, it is understood that only a limited number of objects can appear on streets and most frequently these include pedestrians 118, other vehicles such as cars, bicycles, and scooters 120, specialized equipment 122 (e.g., smartphones associated with pedestrians 118), garbage cans, and animals. This knowledge simplifies the training of the data processing elements on the pole 102 and processing by the object data processing unit 104 of the pole 102 while providing quality information for most objects.

Figure 3:
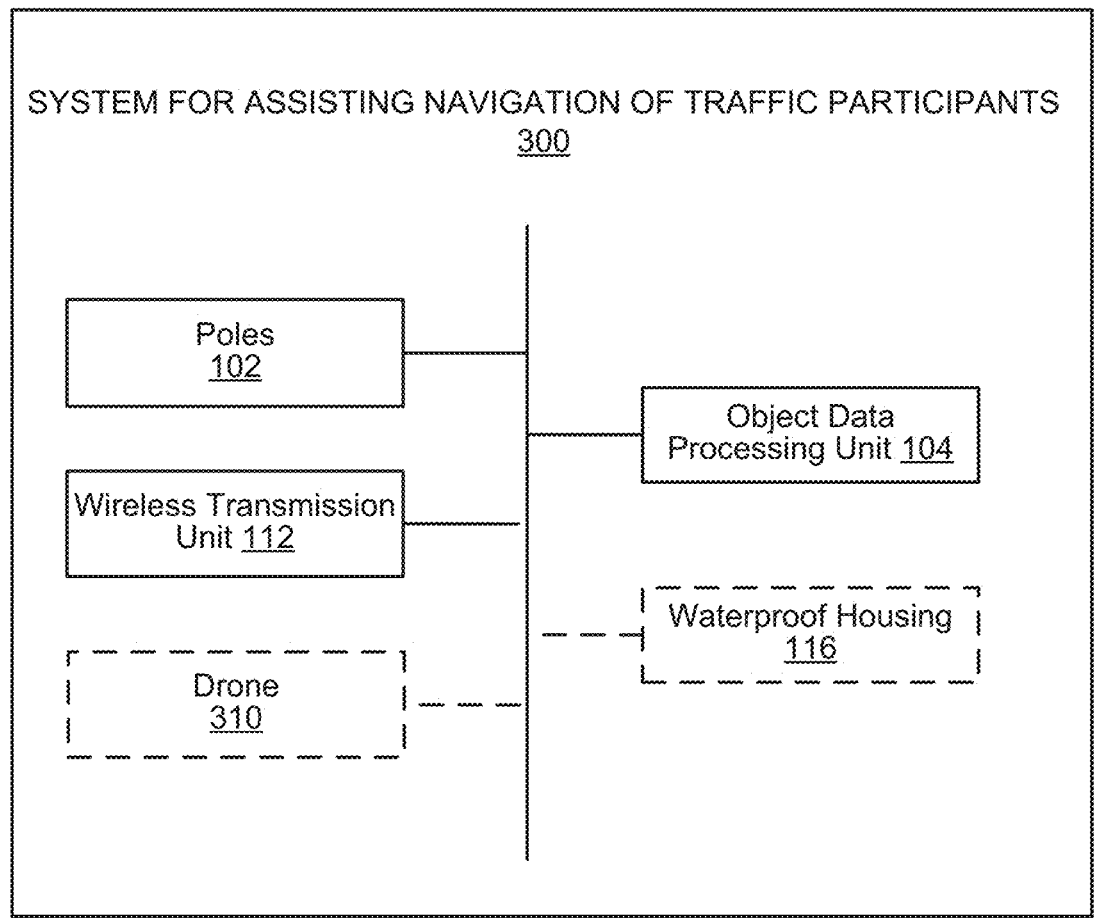
FIG. 3 is a block diagram showing various modules of a system for assisting navigation of traffic participants, in accordance with an exemplary embodiment.

FIG. 3 is a block diagram showing various modules of a system 300 for assisting navigation of traffic participants, in accordance with certain embodiments. Specifically, the system 300 may include a plurality of poles 102 adjacent to a street, an object data processing unit 104, a wireless transmission unit 112, and, optionally, a waterproof housing 116 and a drone 310. One or more sensors may be mounted on the plurality of poles 102. The waterproof housing 116 may be configured to hold the object data processing unit 104 and the wireless transmission unit 112.

Each of the object data processing unit 104 and the wireless transmission unit 112 may include a programmable processor, such as a microcontroller, a central processing unit, and so forth. In exemplary embodiments, each of the object data processing unit 104 and the wireless transmission unit 112 may include an application-specific integrated circuit or programmable logic array designed to implement the functions performed by the system 300. The operations performed by components of the system 300 are further described in detail with reference to FIG. 4.

Figure 4:
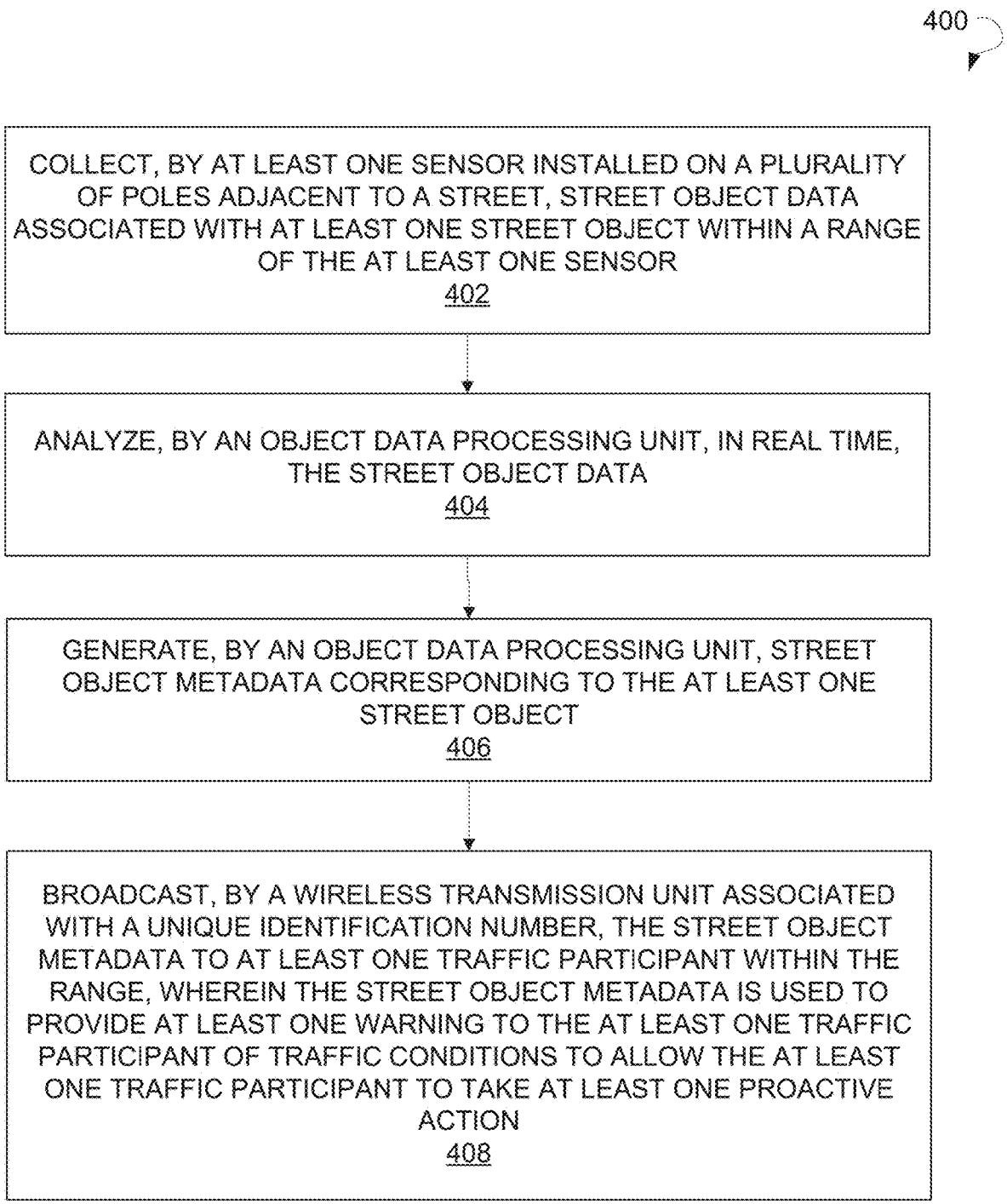
FIG. 4 is a flow chart illustrating a method for assisting navigation of traffic participants, in accordance with an exemplary embodiment.

FIG. 4 is a process flow diagram showing a method 400 for assisting navigation of traffic participants, according to an exemplary embodiment. In some embodiments, the operations may be combined, performed in parallel, or performed in a different order. The method 400 may also include additional or fewer operations than those illustrated. The method 400 may be performed by processing logic that comprises hardware (e.g., decision making logic, dedicated logic, programmable logic, and microcode), software (such as software run on a general-purpose computer system or a dedicated machine), or a combination of both.

The method 400 may commence with collecting, by at least one sensor installed on a plurality of poles adjacent to a street, street object data at operation 402. In an exemplary embodiment, the at least one sensor includes one or more of the following: a camera, an infrared camera, a high-resolution camera, a hyper-spectral image sensor, a radar, an image/video processing unit, a wireless interface, an environmental sensor, a depth estimation sensor, a parallax-based sensor, and so forth. The infrared camera and the hyper-spectral image sensor can be configured to assist in differentiating between living objects and non-living objects and provide information about weather conditions. In some exemplary embodiments, the at least one sensor may be pointed at an area of a possible collision.

The collected street object data may be associated with at least one street object within a range of the at least one sensor. The at least one street object may include an autonomous vehicle, a semi-autonomous vehicle, a human-operated vehicle, a delivery robot, a drone, a pedestrian, a human riding a bicycle, a scooter, or any other type of light personal transportation equipment, a specialized equipment, a garbage can, an automated garbage collection equipment, an animal, a plant, an automated equipment for irrigating the plant, and so forth.

The method 400 may continue with analyzing, by an object data processing unit, the street object data, in real time, at operation 404. In an exemplary embodiment, the object data processing unit may include an image processing unit. The image processing unit may be configured to process at least one image included in the street object data. The image processing unit may include an integrated microprocessor or a specially designed dedicated circuitry.

The method 400 may further include an operation 406, generating street object metadata corresponding to the at least one street object. The street object metadata may be generated based on the collected street object data and analysis of the street object data. In an exemplary embodiment, the street object metadata may include one or more of the following: a classification of the at least one street object based on a machine learning technique trained on a set of predetermined objects, an object location based on location services associated with the wireless transmission unit or triangulation, an object direction, an object velocity, and so forth. The object data processing may store the street object metadata to a cloud, synchronize the street object metadata with the cloud for updates, or use the street object metadata to establish a control channel using a wireless interface of a wireless transmission unit.

The method 400 may further include broadcasting, by the wireless transmission unit, the street object metadata to at least one traffic participant within the range at operation 408. More specifically, the wireless transmission unit may be configured to broadcast the street object metadata using real-time, low latency, low power radio transmitting capabilities, with low bandwidth requirements. The wireless transmission unit may be associated with a unique identification number. In particular, a unique identification number may be assigned to the wireless transmission unit of each pole of the plurality of poles.

The street object metadata may be used to provide at least one warning to the at least one traffic participant of traffic conditions to allow the at least one traffic participant to take at least one proactive action. The at least one warning may be provided by generating an audible signal via a hearing aid, via a smartphone, via a cellular or mobile data, sending an alarm to a first responder, and so forth.

In some embodiments, traffic participants, such as autonomous vehicles, can use broadcasted signal from adjacent poles to see beyond objects separating the street and the sidewalks, around the corner with a building blocking the view, or "see" in front of parked vehicles. The pole may continue to track all objects in its field of view in real-time, broadcast their position and metadata about them, which includes an estimate about their mass/size, their vector of movement direction, and the prediction of their next moves, when such prediction can be made. The autonomous vehicle can process this information in a number of ways, including, but not limited by taking a slowing down action in advance of the possible collision, by focusing sensors, cameras in the direction of a possible collision, and the like. In these embodiments, the autonomous vehicle may be configured to receive notifications from adjacent poles through encrypted or open communication.

Similarly to autonomous cars, a warning of the human drivers about approaching pedestrians can be accomplished with this signal. The car can also perform proactive braking or any other course correction actions in addition to a warning.

The same technology for informing autonomous vehicles about pedestrians can be used by pedestrians to inform them about cars in their vicinity. Hearing aids used by people with low hearing levels can be equipped to receive signals broadcast by the pole over the wireless transmission unit and alert the people to approaching cars, including interpreting additional information about their speed, direction, or any other street object metadata that would be valuable for a pedestrian. Thus, the wireless transmission unit of the pole can broadcast information that is capable of being received by a smartphone or enable a hearing aid. Audible, visual, or tactile messages such as beeps, light flashes, vibrations, or natural language commands can be provided to the wearer.

Humans can also ride bicycles, scooters, and other light personal transportation equipment, either human-powered or electric-powered. Such equipment can be configured with receivers of the broadcasted signal from the poles and warn the human about an imminent threat of a collision. This light personal transportation equipment can also proactively act upon the warning, by braking or other collision avoidance actions.

The street objects can by observed for a period of time and, based on data collected during the observing, future behavior of the at least one street object can be predicted. The predicted behavior may be used for generating street object metadata based on which a warning to the at least one traffic participant of traffic conditions can be provided.

In an exemplary embodiment, the plurality of poles may share the street object metadata to create a mesh network and send advance notices to further poles when a cellular infrastructure is unavailable.

The method 400 may further include following, with a drone, the at least one street object outside the range of the at least one sensor. The drone may collect the street object data outside the range of the at least one sensor. The collected data may be provided by the drone to the object data processing unit.

Furthermore, distracted walking is a new source of car/pedestrian collisions, when people walk and cross the streets looking at the screens unaware of their environments. A mobile device processing signal broadcast by the poles can react by alerting the user of the mobile device at the street crossings with approaching cars or other pedestrians or other obstacles in their path (for example, poles). For example, a smartphone can receive a message and display contents of the message to the user directly on the smartphone informing the user of surrounding traffic.

The same pole broadcasting infrastructure can be used for emergency alerting, including weather emergencies and amber alerts. The poles can also be equipped with accepting emergency signal (911) for reporting an emergency, which can be done via cellular wireless signal or separate, low-power radio protocol.

A plurality of beacons may be used to triangulate the object location obstructed by clouds or buildings. Meanwhile, even if equipped by beacons, some street objects such as garbage cans can still present a challenge for an automated pickup. Combining on-board cameras on the pole with a view from above can create a robust method of operating autonomous garbage can collection vehicles in smart cities. This can also assist in locating misplaced garbage cans.

In another exemplary embodiment, last mile delivery may use delivery robots navigating pedestrian path walks. While cameras can be used by these robots to avoid collisions with humans, additional information received from the poles may help choose the path of the least probability of a collision, and provide the feedback loop for on-board cameras as the robot can continuously match visible moving obstacles with information received from the poles. Location-based information can also augment the location determined with the GPS.

In another exemplary embodiment, the collected street object data and generated street object metadata can be stored at the pole for a limited time for processing by law enforcement and retrieved with specialized equipment, when this information is not streamed to the cloud. This information can help law enforcement correctly attribute the cause of the accidents and provide ground truth information for autonomous vehicle algorithms for their future improvement and further accident reduction.

In another advantageous embodiment, it may be important to broadcast only metadata. For example, for a human, the metadata only includes location, child/adult classifier information, moving direction, speed, and prediction information. Since the signal is localized and low-power, no information is broadcast that is not available for a camera or for any human on the street. Real imagery can still be sent to the cloud, but it is optional, and may not be broadcast.

Beacon and main signal transmission power can take weather conditions in consideration and increase under rain or snow as sensed by any of the integrated environmental sensors (such as sensors 114A-N shown in FIG. 1) or from a weather service that provides weather data over the wireless transmission unit. A camera installed on the pole, because of its view down, can be better protected against rain, snow, or dirt, especially compared to car sensors. It has been reported that self-driving cars cannot be cleaned with automated car washers and must be cleaned by hand due to sensitivity of instruments that cannot be completely isolated from weather if located on a car. Some cities with high level of dust pollution would make autonomous vehicles blind and impossible to navigate.

Moreover, while highways are easier to navigate for autonomous driving, highway exits and entries can be a challenge for navigation. Lanes become curved, physical separation appears, and some exits and entries can have sidewalks crossing them. These locations can take advantage of the solutions disclosed herein.

Specific action can be programmed differently by car manufacturers, but one possible solution may be to safely park and wait for the signal to come back, continue to rely on onboard telemetry with a reduced speed, or switch to the manual driving mode if both modes are available in an autonomously driven vehicle.

The pole-mounted systems for assisting navigation of traffic participants may be protected against spoofing attacks pretending to be poles by implementing public key cryptography or cryptographically signed data. Adversarial spoofing can still be done with cardboard cutouts of vehicles and other objects trying to affect the processing of the camera, but using a dual visible spectrum/infrared spectrum can significantly reduce the mistake. Even if this "visual" spoofing occurs, this object should still be avoided by the car, thus reducing the negative consequences from this form of input spoofing.

Furthermore, a message format used between the pole-mounted system for assisting navigation of traffic participants and devices receiving broadcasts from the poles can be standardized so that both pole equipment and receiver equipment of various manufacturers can be interoperable.

In an exemplary embodiment, pole-mounted systems for assisting navigation of traffic participants can be used to automatically report incidents with people. Based on predicted data, such as behavioral predictions, and a skeleton model, the object data processing unit may make a conclusion that a human had an accident (e.g., fell to the ground) and needs help. Based on this conclusion, the system for assisting navigation of traffic participants may generate a warning to an appropriate person or entity, e.g., a first responder, medical personnel, security personnel, and so forth. This can be useful in playgrounds, retirement communities, hospital territories, college campuses, and the like. Recorded collisions can be automatically saved with geolocation and other meta-information, timestamped and cryptographically signed to prevent evidence tampering.

Figure 5:
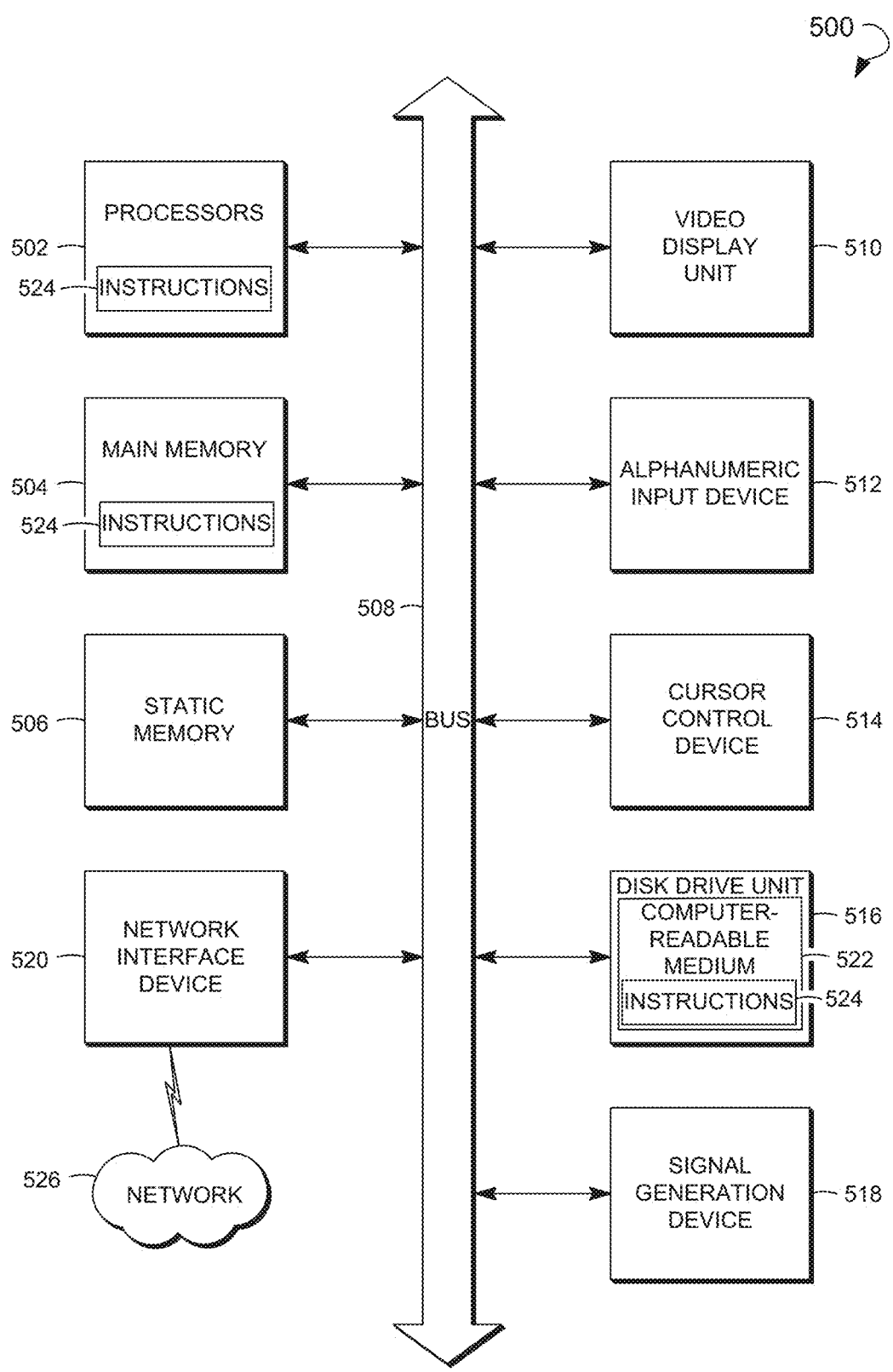
FIG. 5 shows a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a machine in the exemplary electronic form of a computer system 500, within which a set of instructions for causing the machine to perform any one or more of the methodologies discussed herein may be executed. In various exemplary embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an embedded computer, a personal computer (PC), a tablet PC, a set-top box, a cellular telephone, a portable music player (e.g., a portable hard drive audio device such as an Moving Picture Experts Group Audio Layer 3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor or multiple processors 502 (e.g., a central processing unit, a graphics processing unit, or both), a main memory 504 and a static memory 506, which communicate with each other via a bus 508. The computer system 500 may further include a video display unit 510 (e.g., a liquid crystal display or a cathode ray tube. The computer system 500 may also include an alphanumeric input device 512 (e.g., a keyboard), a cursor control device 514 (e.g., a mouse), a disk drive unit 516, a signal generation device 518 (e.g., a speaker) and a network interface device 520, or a capability to connect these peripheral devices for maintenance purposes.

The disk drive unit 516 includes a non-transitory computer-readable medium 522, on which is stored one or more sets of instructions and data structures (e.g., instructions 524) embodying or utilized by any one or more of the methodologies or functions described herein. The instructions 524 may also reside, completely or at least partially, within the main memory 504 and/or within the processors 502 during execution thereof by the computer system 500. The main memory 504 and the processors 502 may also constitute machine-readable media.

The instructions 524 may further be transmitted or received over a network 526 via the network interface device 520 utilizing any one of a number of well-known transfer protocols (e.g., Hyper Text Transfer Protocol).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory, read only memory, and the like.

The exemplary embodiments described herein may be implemented in an operating environment comprising software installed on a computer, in hardware, or in a combination of software and hardware.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

Thus, systems and methods for assisting navigation of traffic participants are described. Although embodiments have been described with reference to specific exemplary embodiments, it will be evident that various modifications and changes can be made to these exemplary embodiments without departing from the spirit and scope of the present application. Accordingly, the specification and drawings are to be regarded in an illustrative rather than a restrictive sense.

What is claimed is:

1. A system for assisting navigation of traffic participants, the system comprising:
    a plurality of poles adjacent to a street, the plurality of poles having at least one sensor installed and configured to collect street object data associated with at least one street object within a range of the at least one sensor;
    at least one object data processing unit installed on the plurality of poles and configured to:
        analyze, in real time, the street object data, wherein the analysis includes:
            detecting a pedestrian approaching at least one traffic participant, the pedestrian being one of the at least one street object;
            based on the street object data, building a skeleton model of the pedestrian; and
            based on the skeleton model, determining a level of distraction of the pedestrian; and
        generate street object metadata corresponding to the at least one street object; and
    at least one wireless transmission unit installed on the plurality of poles and associated with a unique identification number, the at least one wireless transmission unit being configured to:
        broadcast the street object metadata to the at least one traffic participant within the range, wherein the street object metadata is used to provide at least one warning to the at least one traffic participant to allow the at least one traffic participant to take at least one proactive action; and share the street object metadata with further wireless transmission units of the at least one wireless transmission unit to create a mesh network of the plurality of poles communicating with each other.

2. The system of claim 1, wherein the street object metadata includes one or more of the following: a classification of the at least one street object based on a machine learning technique trained on a set of predetermined objects, an object location based on location services associated with the at least one wireless transmission unit or triangulation, an object direction, an object velocity, and a prediction of future movements of the object.

3. The system of claim 2, wherein a plurality of beacons is used to triangulate the object location obstructed by clouds or buildings.

4. The system of claim 1, wherein the at least one sensor includes one or more of the following: a camera, an infrared camera, a high-resolution camera, a hyper-spectral image sensor, a radar, an image/video processing unit, a wireless interface, an environmental sensor, a depth estimation sensor, and a parallax-based sensor.

5. The system of claim 4, wherein the infrared camera and the hyper-spectral image sensor are configured to assist in differentiating between living objects and non-living objects and provide information about weather conditions.

6. The system of claim 1, wherein the at least one wireless transmission unit is configured to broadcast the street object metadata using real-time, low latency, low power (short-distance) capabilities, with low bandwidth requirements.

7. The system of claim 1, wherein the at least one sensor is pointed at an area of a possible collision.

8. The system of claim 1, further comprising a waterproof housing configured to hold the at least one object data processing unit and the at least one wireless transmission unit.

9. The system of claim 1, further comprising an image processing unit configured to process at least one image included in the street object data.

10. The system of claim 9, wherein the image processing unit includes an integrated microprocessor or a specially designed dedicated circuitry.

11. The system of claim 1, wherein the street object metadata is stored to a cloud, synchronized with the cloud for updates, or used to establish a control channel using a wireless interface.

12. The system of claim 1, wherein the at least one street object includes an autonomous vehicle, a semi-autonomous vehicle, a human-operated vehicle, a delivery robot, a drone, the pedestrian, a human riding a bicycle, a scooter, or any other light personal transportation equipment, a specialized equipment, a garbage can, an automated garbage collection equipment, an animal, a plant, and an automated equipment for irrigating the plant.

13. The system of claim 1, wherein the at least one proactive action includes slowing down by a vehicle.

14. The system of claim 1, further comprising a drone configured to follow the at least one street object outside the range of the at least one sensor and collect the street object data.

15. A method for assisting navigation of traffic participants, the method comprising:
  collecting, by at least one sensor installed on a plurality of poles adjacent to a street, street object data associated with at least one street object within a range of the at least one sensor;
  analyzing, by at least one object data processing unit installed on the plurality of poles, in real time, the street object data, wherein the analysis includes:
    detecting a pedestrian approaching at least one traffic participant, the pedestrian being one of the at least one street object;
    based on the street object data, building a skeleton model of the pedestrian; and
    based on the skeleton model, determining a level of distraction of the pedestrian; and
  generating, by the at least one object data processing unit, street object metadata corresponding to the at least one street object; and
  broadcasting, by at least one wireless transmission unit installed on the plurality of poles and associated with a unique identification number, the street object metadata to the at least one traffic participant within the range, wherein the street object metadata is used to provide at least one warning to the at least one traffic participant to allow the at least one traffic participant to take at least one proactive action; and
  sharing, by the at least one wireless transmission unit, the street object metadata with further wireless transmission units of the at least one wireless transmission unit to create a mesh network of the plurality of poles communicating with each other.

16. The method of claim 15, wherein the providing the at least one warning includes generating an audible signal via a hearing aid, via a smart phone, via a cellular or mobile data, and sending an alarm to a first responder.

17. The method of claim 15, further comprising sharing, by the plurality of poles, the street object metadata to create a mesh network and send advance notices to further poles when a cellular infrastructure is unavailable.

18. The method of claim 15, further comprising predicting behavior of the at least one street object based on observing the at least one street object for a period of time.

19. The method of claim 15, further comprising:
  following, by a drone, the at least one street object outside the range of the at least one sensor; and
  collecting, by the drone, the street object data outside the range of the at least one sensor.

20. A system for assisting navigation of traffic participants, the system comprising:
  a plurality of poles adjacent to a street, the plurality of poles having at least one sensor installed and configured to collect street object data associated with at least one street object within a range of the at least one sensor, the street object data including at least one image;
  an image processing unit installed on the plurality of poles and configured to process the at least one image included in the street object data;
  at least one object data processing unit installed on the plurality of poles and configured to:
    analyze, in real time, the street object data, wherein the analysis includes:
      detecting a pedestrian approaching at least one traffic participant, the pedestrian being one of the at least one street object;
      based on the street object data, building a skeleton model of the pedestrian; and
      based on the skeleton model, determining a level of distraction of the pedestrian; and
    generate street object metadata corresponding to the at least one street object;

at least one wireless transmission unit installed on the plurality of poles and associated with a unique identification number, the at least one wireless transmission unit being configured to:
  broadcast the street object metadata to the at least one traffic participant within the range, wherein the street object metadata is used to provide at least one warning to the at least one traffic participant to allow the at least one traffic participant to take at least one proactive action; and
  share the street object metadata with further wireless transmission units of the at least one wireless transmission unit to create a mesh network of the plurality of poles communicating with each other; and
a drone to follow the at least one street object outside the range of the at least one sensor and collect the street object data outside the range of the at least one sensor.

* * * * *